(12) United States Patent
Pervan

(10) Patent No.: US 11,077,652 B2
(45) Date of Patent: Aug. 3, 2021

(54) METHOD OF FORMING A DECORATIVE WEAR RESISTANT LAYER

(71) Applicant: CERALOC INNOVATION AB, Viken (SE)

(72) Inventor: Darko Pervan, Viken (SE)

(73) Assignee: CERALOC INNOVATION AB, Viken (SE)

(*) Notice: Subject to any disclaimer, the term of this patent is extended or adjusted under 35 U.S.C. 154(b) by 0 days.

(21) Appl. No.: 16/410,212

(22) Filed: May 13, 2019

(65) Prior Publication Data

US 2019/0263101 A1 Aug. 29, 2019

Related U.S. Application Data

(63) Continuation of application No. 15/028,873, filed as application No. PCT/SE2014/051246 on Oct. 22, 2014, now Pat. No. 10,328,680.

(30) Foreign Application Priority Data

Oct. 23, 2013 (SE) .................................... 1351260-3

(51) Int. Cl.
*B32B 3/10* (2006.01)
*B32B 37/10* (2006.01)
(Continued)

(52) U.S. Cl.
CPC ................ *B32B 37/10* (2013.01); *B05D 5/02* (2013.01); *B32B 21/08* (2013.01); *B32B 23/08* (2013.01);
(Continued)

(58) Field of Classification Search
None
See application file for complete search history.

(56) References Cited

U.S. PATENT DOCUMENTS 3,210,302 A   10/1965   Bowell
4,554,200 A   11/1985   Caines
(Continued)

FOREIGN PATENT DOCUMENTS

BE   1018213 A3   7/2010
CA   2 626 218 A1   5/2007
(Continued)

OTHER PUBLICATIONS

U.S. Appl. No. 15/980,056, Darko Pervan, filed May 5, 2018 (Cited herein as US Patent Application Publication No. 2018/0319148 A1 of Nov. 8, 2018).
(Continued)

*Primary Examiner* — Christopher M Polley
(74) *Attorney, Agent, or Firm* — Buchanan Ingersoll & Rooney P.C.

(57) ABSTRACT

The disclosure relates to a method to form a digital print on a substrate including a polymer material by bonding particles in powder form to the surface of the substrate. A method of forming a decorative wear resistant layer, the method including: providing a substrate comprising a thermoplastic material and a transparent layer comprising a thermoplastic material, providing a continuous print layer comprising particles on the substrate or on the transparent layer, printing a digital image comprising colour pigments on the print layer, and bonding the print layer with the colour pigments to the transparent layer and to the substrate with heat and pressure such that the digital image is located between the transparent layer and the substrate.

16 Claims, 6 Drawing Sheets

(51) Int. Cl.

| | | |
|---|---|---|
| *B32B 23/08* | (2006.01) | |
| *B32B 38/14* | (2006.01) | |
| *E04F 15/10* | (2006.01) | |
| *B44C 5/04* | (2006.01) | |
| *B32B 21/08* | (2006.01) | |
| *B05D 5/02* | (2006.01) | |
| *B32B 27/08* | (2006.01) | |
| *B32B 27/30* | (2006.01) | |
| *B32B 38/00* | (2006.01) | |
| *B32B 37/24* | (2006.01) | |
| *B05D 1/12* | (2006.01) | |
| *B05D 1/26* | (2006.01) | |
| *B05D 7/04* | (2006.01) | |
| *B32B 37/06* | (2006.01) | |

(52) U.S. Cl.
CPC ............ *B32B 27/08* (2013.01); *B32B 27/304* (2013.01); *B32B 38/14* (2013.01); *B32B 38/145* (2013.01); *B44C 5/0476* (2013.01); *E04F 15/105* (2013.01); *E04F 15/107* (2013.01); *B05D 1/12* (2013.01); *B05D 1/26* (2013.01); *B05D 7/04* (2013.01); *B32B 37/06* (2013.01); *B32B 37/24* (2013.01); *B32B 2255/10* (2013.01); *B32B 2255/26* (2013.01); *B32B 2264/04* (2013.01); *B32B 2307/412* (2013.01); *B32B 2307/554* (2013.01); *B32B 2307/75* (2013.01); *B32B 2419/04* (2013.01); *B32B 2607/00* (2013.01); *Y10T 428/24802* (2015.01); *Y10T 428/24876* (2015.01)

(56) References Cited

U.S. PATENT DOCUMENTS

| | | | |
|---|---|---|---|
| 5,141,599 | A | 8/1992 | Jahn et al. |
| 5,405,681 | A | 4/1995 | Nakayama et al. |
| 5,486,231 | A | 1/1996 | Dulaney |
| 5,989,701 | A | 11/1999 | Goetzen |
| 6,087,416 | A | 7/2000 | Pearlstine et al. |
| 6,270,214 | B1 | 8/2001 | Smith et al. |
| 6,310,115 | B1 | 10/2001 | Vanmaele et al. |
| 6,565,919 | B1 | 5/2003 | Hansson |
| 6,585,369 | B1 | 7/2003 | Sievert et al. |
| 6,800,340 | B1 | 10/2004 | Francescutti |
| 9,409,382 | B2 | 8/2016 | Hakansson et al. |
| 9,605,168 | B2 | 3/2017 | Pervan |
| 9,994,010 | B2 | 6/2018 | Pervan |
| 10,017,950 | B2 | 7/2018 | Pervan |
| 10,071,563 | B2 | 9/2018 | Pervan |
| 10,328,680 | B2 | 6/2019 | Pervan |
| 10,369,837 | B2 | 8/2019 | Ryberg |
| 10,737,506 | B2 | 8/2020 | Pervan |
| 10,899,121 | B2 | 1/2021 | Pervan |
| 2002/0061389 | A1 | 5/2002 | Brooker et al. |
| 2003/0207083 | A1 | 11/2003 | Hansson et al. |
| 2004/0061753 | A1 | 4/2004 | Chen |
| 2004/0191547 | A1 | 9/2004 | Oldorff |
| 2004/0250911 | A1 | 12/2004 | Vogel |
| 2004/0266908 | A1 | 12/2004 | Marguerettaz et al. |
| 2005/0193677 | A1 | 9/2005 | Vogel |
| 2005/0247216 | A1 | 11/2005 | Reichwein et al. |
| 2005/0249929 | A1 | 11/2005 | Reichwein et al. |
| 2005/0259137 | A1 | 11/2005 | Moffat |
| 2006/0179773 | A1 | 8/2006 | Pervan |
| 2006/0194015 | A1 | 8/2006 | Sabater et al. |
| 2006/0236642 | A1 | 10/2006 | Pervan |
| 2007/0058018 | A1 | 3/2007 | Ishibashi |
| 2007/0059492 | A1 | 3/2007 | Oldorff |
| 2007/0193174 | A1 | 8/2007 | Vogel |
| 2007/0224438 | A1 | 9/2007 | Van Benthem et al. |
| 2007/0283648 | A1 | 12/2007 | Chen |
| 2008/0000179 | A1 | 1/2008 | Pervan et al. |
| 2008/0048388 | A1 | 2/2008 | Gauss et al. |
| 2008/0152825 | A1 | 6/2008 | Mukai et al. |
| 2008/0152877 | A1 | 6/2008 | Mukai |
| 2008/0176039 | A1 | 7/2008 | Chen et al. |
| 2008/0252709 | A1 | 10/2008 | Ushiku |
| 2009/0031662 | A1 | 2/2009 | Chen |
| 2009/0038256 | A1 | 2/2009 | Thiers |
| 2010/0091058 | A1 | 4/2010 | Hale et al. |
| 2010/0196678 | A1 | 8/2010 | Vermeulen |
| 2010/0231671 | A1 | 9/2010 | Liew et al. |
| 2010/0300030 | A1 | 12/2010 | Pervan et al. |
| 2010/0307675 | A1 | 12/2010 | Buhlmann |
| 2010/0323187 | A1 | 12/2010 | Kalwa |
| 2011/0012954 | A1 | 1/2011 | Brown et al. |
| 2011/0135815 | A1 | 6/2011 | Ganapathiappan et al. |
| 2011/0151148 | A1 | 6/2011 | Koenig |
| 2011/0177354 | A1 | 7/2011 | Ziegler et al. |
| 2011/0180202 | A1 | 7/2011 | Hirst et al. |
| 2011/0189448 | A1 | 8/2011 | Lindgren et al. |
| 2011/0200750 | A1 | 8/2011 | Meersseman et al. |
| 2011/0234727 | A1 | 9/2011 | Aoki et al. |
| 2011/0247748 | A1 | 10/2011 | Pervan et al. |
| 2011/0250404 | A1* | 10/2011 | Pervan .................. B44C 5/0446 428/173 |
| 2011/0273515 | A1 | 11/2011 | Takafumi et al. |
| 2011/0286493 | A1 | 11/2011 | Torniainen |
| 2011/0303113 | A1 | 12/2011 | Sarkisian et al. |
| 2012/0015107 | A1 | 1/2012 | Schacht et al. |
| 2012/0113193 | A1 | 5/2012 | Yamashita |
| 2012/0147108 | A1 | 6/2012 | Ganapathiappan et al. |
| 2012/0169808 | A1 | 7/2012 | Kiyomoto et al. |
| 2012/0178844 | A1 | 7/2012 | Frey et al. |
| 2012/0229885 | A1 | 9/2012 | Chen et al. |
| 2012/0249705 | A1 | 10/2012 | Aoki et al. |
| 2012/0288689 | A1 | 11/2012 | Hansson et al. |
| 2012/0320137 | A1 | 12/2012 | Fujii et al. |
| 2013/0045364 | A1 | 2/2013 | Sjöberg |
| 2013/0062006 | A1 | 3/2013 | Meersseman et al. |
| 2013/0063528 | A1 | 3/2013 | Govyadinov |
| 2013/0067842 | A1* | 3/2013 | Meersseman ............ E04F 15/10 52/309.4 |
| 2013/0122255 | A1 | 5/2013 | Chen |
| 2013/0284391 | A1 | 10/2013 | Brinkmann |
| 2013/0286088 | A1 | 10/2013 | Ryberg et al. |
| 2013/0305649 | A1 | 11/2013 | Thiers |
| 2014/0017452 | A1 | 1/2014 | Pervan |
| 2014/0028772 | A1 | 1/2014 | Pervan |
| 2014/0144583 | A1 | 5/2014 | Hakansson et al. |
| 2014/0186610 | A1 | 7/2014 | Pervan |
| 2014/0198168 | A1 | 7/2014 | Pervan et al. |
| 2015/0064423 | A1 | 3/2015 | Ohmoto |
| 2015/0167319 | A1 | 5/2015 | Saegart |
| 2015/0184013 | A1 | 7/2015 | Double et al. |
| 2015/0210055 | A1 | 7/2015 | Pervan |
| 2015/0218395 | A1 | 8/2015 | Pervan |
| 2016/0208121 | A1 | 7/2016 | De Mondt et al. |
| 2016/0250835 | A1 | 9/2016 | Pervan |
| 2016/0332479 | A1 | 11/2016 | Clement |
| 2017/0152392 | A1 | 6/2017 | Pervan |
| 2018/0319148 | A1 | 11/2018 | Pervan |
| 2018/0354272 | A1 | 12/2018 | Pervan |
| 2019/0085569 | A1 | 3/2019 | Ryberg |

FOREIGN PATENT DOCUMENTS

| | | |
|---|---|---|
| CN | 101885200 A | 11/2010 |
| CN | 102781677 A | 11/2012 |
| CN | 102781677 B | 7/2014 |
| DE | 101 56 956 A1 | 6/2003 |
| DE | 10 2010 045 266 A | 3/2012 |
| EP | 0 739 743 A1 | 10/1996 |
| EP | 1 041 126 A2 | 10/2000 |
| EP | 1 242 702 | 9/2002 |
| EP | 1 314 766 A1 | 5/2003 |
| EP | 1 328 407 | 7/2003 |
| EP | 1 403 343 A1 | 3/2004 |
| EP | 1 454 763 A2 | 9/2004 |
| EP | 1 242 702 B1 | 11/2004 |
| EP | 1 577 354 A2 | 9/2005 |
| EP | 1 577 354 A3 | 9/2005 |

(56) References Cited

FOREIGN PATENT DOCUMENTS

| | | |
|---|---|---|
| EP | 1 584 378 A1 | 10/2005 |
| EP | 1 762 671 A1 | 3/2007 |
| EP | 1 328 407 B1 | 8/2008 |
| EP | 1 980 598 A1 | 10/2008 |
| EP | 1 454 763 B1 | 8/2009 |
| EP | 2 202 056 A1 | 6/2010 |
| EP | 2 213 476 A1 | 8/2010 |
| EP | 2 264 259 A2 | 12/2010 |
| EP | 2 313 281 | 4/2011 |
| EP | 2 313 281 B1 | 7/2012 |
| EP | 2 623 567 A1 | 8/2013 |
| EP | 2 623 567 B1 | 11/2014 |
| JP | H05-162230 A | 6/1993 |
| JP | 2001-254503 A | 9/2001 |
| JP | 2006-281538 A | 10/2006 |
| JP | 2008-265229 A | 11/2008 |
| JP | 2012-077446 A | 4/2012 |
| WO | WO 01/19618 A1 | 3/2001 |
| WO | WO 01/47717 A1 | 7/2001 |
| WO | WO 01/48333 A1 | 7/2001 |
| WO | WO 01/53387 A1 | 7/2001 |
| WO | WO 02/42087 A2 | 5/2002 |
| WO | WO 02/42087 A3 | 5/2002 |
| WO | WO 2004/042168 A1 | 5/2004 |
| WO | WO 2005/097874 A2 | 10/2005 |
| WO | WO 2006/001880 A2 | 1/2006 |
| WO | WO 2006/088417 A2 | 8/2006 |
| WO | WO 2006/106931 A1 | 10/2006 |
| WO | WO 2007/015669 A2 | 2/2007 |
| WO | WO 2007/015669 A3 | 2/2007 |
| WO | WO 2008/004960 A2 | 1/2008 |
| WO | WO 2008/004960 A3 | 1/2008 |
| WO | WO 2008/004960 A8 | 1/2008 |
| WO | WO 2009/018260 A1 | 2/2009 |
| WO | WO 2009/065769 A2 | 5/2009 |
| WO | WO 2009/065769 A3 | 5/2009 |
| WO | WO 2009/080813 A1 | 7/2009 |
| WO | WO 2009/097986 A1 | 8/2009 |
| WO | WO 2009/116926 A1 | 9/2009 |
| WO | WO 2009/124704 A1 | 10/2009 |
| WO | WO 2010/084386 A2 | 7/2010 |
| WO | WO 2010/084386 A3 | 7/2010 |
| WO | WO 2010/087752 A1 | 8/2010 |
| WO | WO 2011/020755 A1 | 2/2011 |
| WO | WO 2011/087422 A1 | 7/2011 |
| WO | WO 2011/087423 A1 | 7/2011 |
| WO | WO 2011/103641 A1 | 9/2011 |
| WO | WO 2011/105613 A1 | 9/2011 |
| WO | WO 2011/129757 A1 | 10/2011 |
| WO | WO 2011/141849 A2 | 11/2011 |
| WO | WO 2011/141849 A3 | 11/2011 |
| WO | WO 2011/146149 A1 | 11/2011 |
| WO | WO 2012/004701 A2 | 1/2012 |
| WO | WO 2013/032387 A1 | 3/2013 |
| WO | WO 2013/179260 A1 | 12/2013 |
| WO | WO 2014/011110 A1 | 1/2014 |
| WO | WO 2014/017972 A1 | 1/2014 |
| WO | WO 2014/027179 A1 | 2/2014 |
| WO | WO 2014/084787 A1 | 6/2014 |
| WO | WO 2015/058974 A1 | 4/2015 |

OTHER PUBLICATIONS

U.S. Appl. No. 16/103,124, Darko Pervan, filed Aug. 14, 2018 (Cited herein as US Patent Application Publication No. 2018/0354272 A1 of Dec. 13, 2018).
U.S. Appl. No. 16/085,277, Melker Ryberg, filed Sep. 14, 2018 (Cited herein as US Patent Application Publication No. 2019/0085569 A1 of Mar. 21, 2019).
International Search Report and Written Opinion issued in PCT/SE2014/051246, dated Mar. 24, 2015, ISA/SE Patent-och registreringsverket, Stockholm, SE, 13 pages.
Extended European Search Report issued in EP 14856104.6, dated May 31, 2017, European Patent Office, Munich, DE, 7 pages.
Pervan, Darko, et al., Technical Disclosure entitled Digital Printing and Embossing, IP.com No. IPCOM000224950D, IP.com PriorArtDatabase, Jan. 15, 2013, 89 pages (XP13155608 A).
Pervan, Darko, Technical Disclosure entitled "Digital Overlay," IP.com No. IPCOM000225271D, IP.com PriorArtDatabase, Feb. 5, 2013, 24 pages (XP 13155893 A).
Extended European Search Report issued in EP 20161776.8, dated Jun. 19, 2020, European Patent Office, Munich, DE, 7 pages.
U.S. Appl. No. 16/864,411, Darko Pervan, filed May 1, 2020.
International Preliminary Report on Patentability/Written Opinion of the International Searching Authority, issued in corresponding PCT/SE2015/050063, dated Apr. 24, 2015, ISA/SE, Stockholm, SE, 8 pages.
Pervan, Darko, U.S. Appl. No. 16/864,411 entitled "Digital Print with Water-Based Ink," filed May 1, 2020.

\* cited by examiner

METHOD OF FORMING A DECORATIVE WEAR RESISTANT LAYER

CROSS REFERENCE TO RELATED APPLICATIONS

The present application is a continuation of U.S. application Ser. No. 15/028,873, filed on Apr. 12, 2015, which is a U.S. national stage of International Application No. PCT/SE2014/051246, filed on Oct. 22, 2014. The entire contents of each of U.S. application Ser. No. 15/028,873 and International Application No. PCT/SE2014/051246 are hereby incorporated herein by reference in their entirety.

TECHNICAL FIELD

The disclosure generally relates to the field of digitally created decorative surfaces for building panels such as floor and wall panels. The disclosure relates to a method of forming a print layer and to semi finished product and panels comprising such print layer.

FIELD OF APPLICATION

Embodiments of the present invention are particularly suitable for use in floors, which are formed of floor panels comprising a core, a decorative layer and preferably a transparent wear resistant structured layer above the decorative layer. Preferred embodiments are laminate floors and plastic based LVT floors. The following description of techniques, problems of known technology and objects and features of the invention will therefore, as a non-restrictive example, be aimed above all at this field of application and in particular at floorings with a resilient surface layer.

It should be emphasized that embodiments of the invention may be used to produce a digital image on any surface but flat panels such as for example building panels in general, wall panels, ceilings, furniture components and similar products that generally have large surfaces with advanced decorative patterns are preferred. The basic principles of the invention may be used to apply a digital print on dense surfaces such as plastic materials or metal foils and polymer impregnated or coated paper or foils.

BACKGROUND

The following description is used to describe the background and products, materials and production methods that may comprise specific parts of preferred embodiments in the disclosure of this invention.

The majority of all laminate floors are produced according to a production method generally referred to as Direct Pressed Laminate (DPL). Such laminated floors have a core of 6-12 mm fibreboard, a 0.2 mm thick upper decorative surface layer of laminate and a 0.1-0.2 mm thick lower balancing layer of laminate, plastic, paper or like materials.

The surface layer of a laminate floor is characterized in that the decorative and wear properties are generally obtained with two separate layers of paper, one above the other. The decorative layer is generally a printed paper and the wear layer is a transparent overlay paper, which comprises small aluminium oxide particles.

The printed decorative paper and the overlay are impregnated with melamine formaldehyde resins, generally referred to as melamine resins. The impregnation is based on a two-step process where the paper in a first step passes a bath of liquid melamine resin and in a second step is dried to a sheet that is completely impregnated and covered with a dry melamine resin. The décor paper that prior to impregnation has a weight of 60-80 gr/m2 comprises generally about 50 wt % of melamine formaldehyde thermosetting resins. The resin content in the overlay may be even higher. Aluminium oxide particles are applied and incorporated during impregnation into the resin layer on one side of the overlay paper that during pressing is in contact with the décor paper. The impregnated papers are laminated to a HDF core in large discontinuous or continuous laminate presses where the resin cures under high heat (about 170° C.) and pressure (40-60 bars) and the papers are laminated to the core material. An embossed press plate or steal belt forms the surface structure.

Digital printing may be used to print an image on the decorative paper sheet or on the overlay. The digital printing is generally made prior to impregnation and the flexibility that the digital technology provides cannot be fully utilized. It would be an advantage if digital print may be made after impregnation and on an impregnated paper or if impregnation could be avoided. Printing directly on a melamine impregnated paper is difficult since the ink drops applied on the melamine layer bleed during printing and especially when the dry melamine layer becomes liquid and floats during the pressing operation.

Laminate floors may also have a surface of coated paper, foils or plastic foils and such foil materials are difficult to print digitally. A protective wear resistant transparent layer that generally is a polyurethane lacquer is used to covers the printed décor.

Luxury Vinyl Tiles, generally referred to as LVT floorings, are designed as a layered product made of thermoplastic PVC mixed with plasticizers. The name LVT is somewhat misleading since a major part of LVT floors have a plank size with a wood pattern.

Thermal moulding based on calendar rolling or extrusion is used to form the PVC layers. During the calendar rolling, the PVC material is heated to its softening temperature and exposed to pressure between cylinders and cooled down.

The base layer or the core is made primarily of PVC mixed with chalk and/or limestone fillers and has a high quality printed decorative PVC foil on the upper side. A transparent wear layer of vinyl with a thickness of 0.2-0.6 mm is generally applied on the decorative foil. When PVC is heated it becomes soft like a paste and bonds under heat and pressure to other PVC materials but also to organic and inorganic fibres or minerals when cooled down to room temperature. The base layer, the decorative foil and the transparent layer are fused or laminated together with heat and pressure in continuous or discontinuous press operations. The laminated sheets are after pressing annealed to remove stress and to achieve increased dimensional stability. Calendar rolling, pressing and annealing general takes pace at temperatures between 120° C.-160° C. Annealing may be combined with ageing at temperatures around 25° C.-30° C. during a few days.

The decorative effects are obtained with a white decorative foil that covers a dark colour of the core and provides a base colour for the rotogravure printing process where special solvent based inks are used that bond to the PVC surface. Such inks are difficult to combine with an environmental friendly, flexible and cost efficient printing process, especially when a digital printing method is used.

LVT floors offer several advantages over for example laminate floors such as deep embossing, flexibility, dimensional stability related to humidity, moisture resistance and lower sound. Digital printing of LVT floors is only on an experimental stage since it is difficult to print on the plastic foil but would, if introduced, provide major advantages over conventional printing technology.

As a summary it may be mentioned that only small volumes of floor panels are printed digitally, especially vinyl and laminate floorings, mainly due to high cost of ink and high investment cost for the industrial printers but also due to the fact that it is difficult to apply a digital print on the specific surface materials used in such flooring applications.

Definition of Some Terms

In the following text, the visible surface of the installed floor panel is called "front side", while the opposite side of the floor panel, facing the sub floor, is called "rear side".

By "up" is meant towards the front side and by "down" towards the rear side. By "vertically" is meant perpendicular to the surface and by "horizontally" parallel to the surface.

By "binder" is meant a substance that connects or contributes to connect two particles or materials. A binder may be liquid, powder based, a thermosetting or thermoplastic resin and similar. A binder may consist of two components that react when in contact with each other for example water and dry melamine.

By "digital printing" is meant a digitally controlled ejection of drops of fluid that is used to position colorants in pre-defined patterns onto a surface.

Known Technique and Problems Thereof

The general technologies, which are used by the industry to provide a digital print is described below. The methods may be used partly or completely in various combinations with preferred embodiments in order to create a digital print according to this disclosure.

High definition digital ink jet printers use a non-impact printing process. The printer has print heads that "fire" drops of ink from the print head to the surface in a very precise manner.

Industrial printers are generally based on a Single Pass Printing method, which uses fixed printer heads, with a width that corresponds to the width of the printed media. The printed surface moves under the heads. Such printers have a high capacity and they are equipped with fixed print heads that are aligned one after each other in the feeding direction. In general each print head prints one colour. Such printers may be custom made for each application.

A suitable printer head has to be used in order to obtain a high printing quality and speed.

A print head has several small nozzles that can shoot and apply droplets of inks in a controlled way in a raster pattern.

Thermal print head technology, generally referred to as bubble jet printing, use print cartridges with a series of tiny chambers each containing a heater. To eject a droplet from each chamber, a pulse of current is passed through the heating element causing a rapid vaporization of the ink in the chamber to form a bubble, which causes a large pressure increase, propelling a droplet of ink out through the nozzle and to the surface intended to be printed.

Thermal technology imposes the limitation that the ink must be heat-resistant, generally up to 300° C. because the firing process is heat-based. This makes it very difficult to produce pigment based multi colour thermal heads.

Most commercial and industrial inkjet printers use the Piezoelectric printer head technology, which is the major technology used in the flooring industry. A piezoelectric crystal material (generally called Piezo) in an ink-filled chamber behind each nozzle is used instead of a heating element. When a voltage is applied, the piezoelectric material changes shape, which generates a pressure pulse in the fluid forcing a droplet of ink to be ejected from the nozzle. Piezo inkjet allows a wider variety of inks and higher viscosity than thermal inkjet.

A lot of different ink types may be used. The main components are colorants that provide the colour, a binder that bonds the colorants to the surface intended to be printed and a liquid carrier that transfers the colorant and the binder from the print head in well-defined small drops to the surface with a non-contact application method. The colorant is either a dye or pigment or a combination of both. The carrier fluid may be water-based or solvent based. The carrier fluid evaporates and leaves the colorant on the surface. UV curable inks are similar to solvent based inks but the carrier fluid cures when exposed to strong UV light.

Pigments are very fine powder of solid colorant particles that are suspended or dispersed throughout a liquid carrier. Pigment based inks are generally individually mixed together by using colour pigments and several chemicals.

Pigment inks are generally more light stable, especially when exposed to UV light, and more fade resistant than dye-based inks. They are therefore used in almost all flooring applications. Water based digital inks comprising colour pigments are especially suitable for flooring applications and may provide a high quality printing method in many different materials, provided that the materials have surface structure that allows the liquid to partially penetrate into the upper part of the surface.

Generally the pigments do not stick to a smooth surface. They are similar to sand particles and may be easily removed from most dry and smooth surfaces. The water based carrier fluid is therefore generally mixed with small amounts of several other additives to provide special ink and print properties such as binders that provide the adhesion of the pigments to a surface, dot gain, pH level, drop formation, corrosion of the print head, fade resistance etc. The inclusion of resins that serve as binder in the ink composition limits the possible amount of pigments, as both components increases the ink viscosity.

Digital printing with water based ink comprising colour pigments is a very flexible and environmental friendly method that may provide a high quality print on for example a paper substrate but also in several powder based materials. It cannot be fully utilized in several flooring applications where special materials such as thermoplastic materials or melamine-impregnated papers are used as a substrate for the décor. The ink drops float and bleed when they hit a compact surface that is not able to absorb the liquid water based ink drops. It would be a major advantage if digital images may be formed with water based ink on such compact and dense surfaces.

Several methods are used to improve the printing properties of a digital print applied on smooth surfaces. Such methods comprise special inks and various types of coatings.

WO 2009/097986 describes a method to produce a special printing paper by coating a fibre-based paper with open fibres in order to improve the printing quality and to facilitate impregnation after the printing step. This method cannot be used when a print is applied on for example a melamine-impregnated paper where all fibres are covered with a melamine layer.

WO 2001053387 describes a transfer method to form a print on a PVC tile base. The method involves transferring the ink of a printed design, originally on a paper roll, to the tile base at the lamination nip. The paper is subsequently removed with a re-wind operation immediately following the lamination. There is no description of the ink and paper type or that the print may be a digital print and the method does not give any guidance of how a digital print may be obtained or transferred to a thermoplastic material.

US 20110180202 describes that digitally formed images such as sublimation dyes may be heat transferred onto vinyl flooring materials. Heat activation occurs in temperatures between 160° C.-210° C. and this is above the normal softening temperature of PVC material used in LVT floors. An enhanced thermo-mechanical property or the flooring material is therefore required that inhibits shrinkage from heat exposure. This is a major disadvantage and the printing method cannot be used in LVT floors comprising conventional PVC materials.

So-called dry impregnation has been known and used for a long time. An impregnated core paper is applied under an unimpregnated décor paper and the impregnation of the décor paper is made during pressing when resins from the overlay and the core paper penetrate into the décor paper. The décor paper may also be coated with a melamine resin on a lower side and a digital print may be applied on the raw upper side. Such production methods are expensive and have been mainly used for sample production.

WO 2013/032387 describes that separate layers such as a liquid melamine layer or a powder layer comprising wood fibres and melamine powder may be applied on a core. An unimpregnated raw paper is thereafter applied on the core and the separate layer, prior to the digital printing step. The printed paper is during pressing impregnated from above by the resins from the overlay and from below by the resins in the separate powder layer.

Although this is a flexible and cost efficient method, there is still room for improvements especially related to properties such as internal bond, production costs and production flexibility.

A disadvantage with know digital printing technologies is that inks floats, especially water based ink, when ink drops are applied on a substrate with dense and closed surface such as thermoplastic foils used in LVT floors and resin impregnated papers used in laminate floors.

The above description of various known aspects is the applicants' characterization of such, and is not an admission that the above description is prior art when the various technologies are used partly or completely in various combinations.

OBJECTS AND SUMMARY

An objective of at least certain embodiments of the invention is to provide a method to apply a digital print with preferably water-based ink comprising pigments on dense surfaces. A specific objective is to provide a semi finished product based on a dense substrate that may be used as a print layer for a digital print. Another objective is to provide a LVT floor or a laminate floor with a digitally printed décor.

The invention is based on a first principle where a print layer is formed by ink receiving particles and a pigment based digital print is formed on the print layer. The pigments and the print layer are incorporated into a decorative wear resistant surface comprising several layers and adapted such that the pigments and the print layer are compatible with the production methods that are used to form the surface and to bond the layers of the finished product. The principle may be used to produce a digitally printed floor panel with a decorative wear resistant surface comprising thermoplastic or thermosetting material. The principle may also be used to produce a semi-finished print base comprising a thermoplastic or thermosetting surface with a print layer comprising particles that may be used to provide a digitally printed decorative layer.

The invention is also based on a second principle wherein a digital print is applied on a substrate with a binder and powder (BAP) printing method where colour pigments or so called dry ink particles are applied in dry form and bonded in patterns by digitally applied transparent blank ink drops. The printing method, the blank ink and the dry ink have been specially adapted to provide a high quality print on a dense surface such as a thermoplastic foil or a paper impregnated with a thermosetting resin, for example, a melamine formaldehyde impregnated paper.

According to a first aspect of the invention a method of forming a decorative wear resistant layer, the method comprising:
providing a substrate comprising a thermoplastic material and a transparent layer comprising a thermoplastic material,
providing a continuous print layer comprising particles on the substrate or on the transparent layer,
printing a digital image comprising colour pigments on the print layer,
bonding the print layer with the colour pigments to the transparent layer and to the substrate with heat and pressure such that the digital image is located between the transparent layer and the substrate.

The transparent layer may be a thermoplastic foil, preferably a PVC foil. The transparent layer is preferably a transparent wear resistant layer.

The substrate may be a thermoplastic foil, preferably a PVC foil.

The substrate may be a core, preferably comprising a thermoplastic material, preferably PVC, and fillers.

The print layer may, prior to printing, be bonded to the substrate or to the transparent layer with a binder.

The print layer may, prior to printing, be bonded to the substrate or the transparent layer, preferably with heat and pressure.

The print layer may be a paper layer or loose particles.

The particles may comprise fibres, preferably cellulose fibres, more preferably at least partially bleached cellulose fibres.

The particles may comprise a thermoplastic powder, preferably a PVC powder.

The print may be made with water-based ink, preferably comprising an acrylic binder.

The digital print may be made with a liquid binder that bonds a powder comprising pigments.

The substrate may be a part of a building panel, preferably a floor panel.

The substrate may be a part of a LVT floor panel.

According to a second aspect, a floor panel is provided comprising a core comprising a thermoplastic material, a decorative layer arranged on the core, wherein the decorative layer comprises a thermoplastic material, and a transparent layer arranged on the decorative layer, wherein the transparent layer comprises a thermoplastic material. The decorative layer comprises a digital print provided by ink comprising pigments and an acrylic binder.

The decorative layer may further comprise particles to which the pigments are attached.

The particles may comprise fibres such as cellulose fibres or a thermoplastic powder such as PVC.

According to a third aspect, a floor panel is provided comprising a core comprising a thermoplastic material. A decorative layer is arranged on the core, wherein the decorative layer comprises a thermoplastic material, and a transparent layer is arranged on the decorative layer, wherein the transparent layer comprises a thermoplastic material. The decorative layer comprises a print layer arranged under the transparent layer. The print layer comprises particles and colour pigments attached to said particles.

The particles may comprise fibres such as cellulose fibres or a thermoplastic powder such as PVC.

According to a fourth aspect, a flexible sheet shaped print base is provided. The sheet shaped print base comprises a substrate and a print layer, the substrate having two opposite surfaces, wherein one of said surfaces comprises a thermoplastic material and is essentially covered with the print layer. The print layer comprises particles comprising fibres or a polymer material. The particles are bonded to said surface.

The substrate may be a thermoplastic foil, preferably a PVC foil.

The fibres may be cellulose fibres.

The polymer material may comprise a thermoplastic material such as PVC.

The surface may be completely covered with the print layer.

According to a fifth aspect, a flexible sheet shaped print base is provided. The flexible sheet shaped print base comprises a substrate and a print layer. The substrate has two opposite surfaces, wherein one of said surfaces comprises a paper impregnated with a thermosetting resin and is essentially covered with said print layer, and wherein the print layer comprises cellulose fibres, said cellulose fibres being bonded to said surface.

The resin may be an amino resin such as melamine formaldehyde resin.

The fibres may be cellulose fibres.

The surface may be completely covered with the print layer.

The surface may comprise a base colour.

According to a sixth aspect, a method of forming a decorative wear resistant surface layer with a digital print head is provided. The method comprising:
providing a substrate comprising cellulose fibres, wherein the substrate is impregnated with a thermosetting resin and comprises a base colour,
printing a digital image on the substrate with a digital print head that applies ink drops of a water based ink having a viscosity exceeding about 10 cps on the substrate, and wherein the ink drops are positioned in a raster pattern with a space between each other,
applying cellulose fibres coated with pigments on the water based ink drops and the substrate,
bonding a part of the pigment coated cellulose fibres to the water based ink drops,
removing non bonded pigment coated fibres from the substrate,
applying a transparent layer comprising cellulose fibres on the digital image such that the digital image is located between the transparent layer and the substrate, and
bonding the substrate, the bonded part of the pigment coated fibres and the transparent layer with heat and pressure.

The ink may comprise water based glycol or glycerine solution combined with a binder.

The thermosetting resin of the substrate may be melamine formaldehyde resin.

The substrate may be a paper layer impregnated with at least 40 wt % of a thermosetting resin, preferably a melamine formaldehyde resin.

The pigment coated cellulose fibres may have a fibre thickness of about 10-50 microns and a length of about 50-150 microns.

The pigment coated cellulose fibres may comprise a thermosetting resin or an acrylic binder.

According to a seventh aspect, a method of forming a decorative wear resistant surface layer with a digital print head is provided. The method comprising:
providing a thermoplastic substrate comprising a base colour,
printing a digital image on the substrate with a digital print head that applies ink drops of a water based ink having a viscosity exceeding about 10 cps on the substrate, and wherein the ink drops are positioned in a raster pattern with a space between each other,
applying thermoplastic particles comprising pigments on the water based ink drops and the substrate,
bonding a part of thermoplastic particles to the water based ink drops,
removing non bonded thermoplastic particles from the substrate,
applying a transparent layer comprising a thermoplastic material on the digital image such that the digital image is located between the transparent layer and the substrate, and
bonding the substrate, the bonded part of the thermoplastic particles and the transparent layer with heat and pressure.

The water based ink may comprise a water based glycol or glycerine solution combined with an acrylic binder.

The pigments may be bonded to the thermoplastic particles with an acrylic binder.

BRIEF DESCRIPTION OF THE DRAWINGS

The invention will in the following be described in connection to embodiments and in greater detail with reference to the appended exemplary drawings, wherein, FIGS. 1a-d Illustrate a LVT panel and methods to produce a digitally printed surface.

DETAILED DESCRIPTION

Figure 1A:
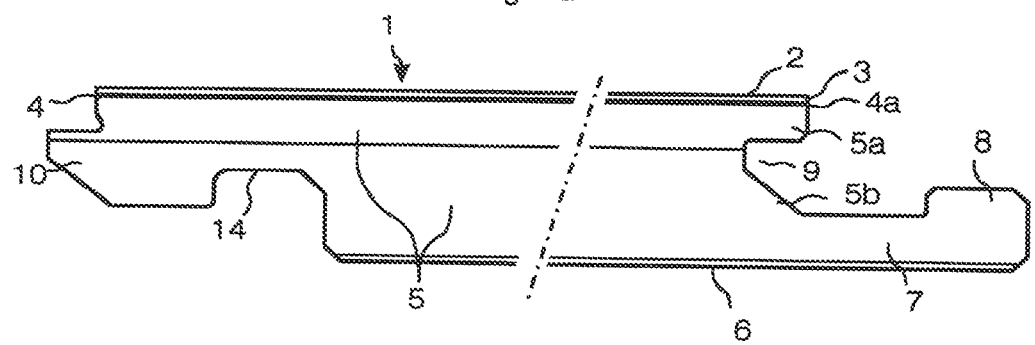

FIG. 1a shows a LVT flooring panel 1 which is intended to be installed floating with a mechanical locking system comprising a tongue 10 and a tongue groove 9 for vertical locking and a strip 7 with a locking element 8 in one edge that cooperates with a locking groove 14 in an opposite edge and locks in horizontal direction. The panel may also have straight edges and may be installed by gluing down to the sub floor.

The core 5 may comprise one or several layers 5a, 5b, preferably comprising a thermoplastic material. Said one or several layers 5a, 5b may be made primarily of PVC mixed with 20-80% chalk or limestone fillers mainly in order to reduce material costs.

The core 5 has a substrate 4 on the upper side, which may be a printed decorative foil 4a comprising thermoplastic material such polyvinylchloride (PVC). This decorative foil 4a may be very thin. The decorative foil 4a may have a thickness of about 0.05-0.10 mm. A transparent wear layer 3 comprising a thermoplastic material such as PVC is applied on the decorative foil 4a. The transparent wear layer 3 may have a thickness of 0.2-0.6 mm. A balancing layer 6 may in some embodiments be applied on the rear side of the core 5 in order to prevent curving. The core 5a, 5b, the decorative foil 4, the transparent layer 3 and the balancing layer 6 are fused together with heat and pressure in a continuous or discontinuous press operation. Binders may also be used to connect the core 5 to the upper layers. The heat bonding of thermoplastic materials such as PVC may be made in temperatures between 130° C.-160° C. and with a pressure of 5-10 bars. A higher pressure may be used. The transparent layer may include a coating 2 of polyurethane, which provides additional wear and stain resistance. The transparent wear layer 3 may be replaced with a polyurethane layer 2 that is applied directly on the decorative foil 4a. The transparent layer 3 may also comprise transparent PVC powder that is pressed and fused to a decorative layer 4.

LVT floors with a PVC core comprising fillers and which are intended to be installed floating with a mechanical locking system have generally a thickness of 3-6 mm. The core 5 may be reinforced with glass fibres and may comprise several layers 5a, 5b with different densities and material composition. The lower side of the core 5 may comprise grooves or cavities in order to decrease the weight and to save material.

Figure 1B:
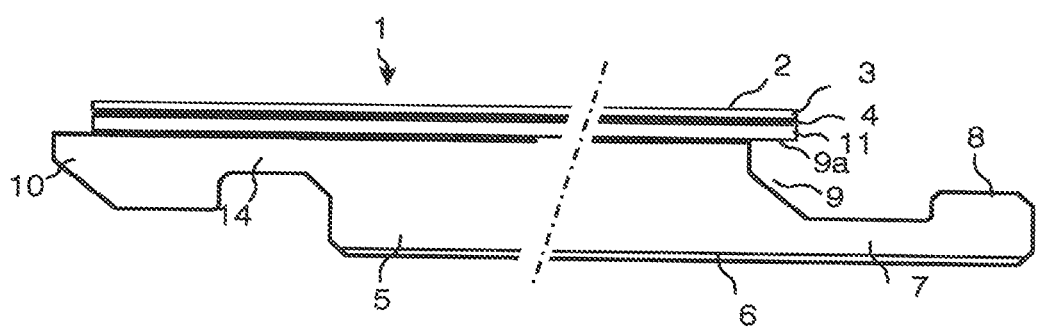

FIG. 1b shows a floor panel with a resilient decorative surface similar to the embodiment shown in FIG. 1a. The decorative wear resistant surface 4, 3, may comprise a sub layer 11 that preferably is softer than the upper layers 3, 4 and that may provide sound reduction. The core 5 is in this embodiment a HDF or MDF core 5 or a core 5 comprising a composite material for example thermoplastic material, preferably polyvinylchloride (PVC) or polypropylene (PP) mixed with wood fibres. Many other core materials may be used, preferably moisture resistant materials such as cement bonded particleboards or other types of mineral based board material. The core 5 may even comprise a ceramic material and the resilient upper layers may provide a soft surface with lower sound. Such panels with a ceramic core may also be installed floating and may comprise a mechanical locking system.

The upper lip 9a of the tongue groove 9 may be partially formed in the core material 5. The upper layers 11, 4, 3 may also be used to form essentially the whole part of the upper lip 9a. Such a locking system comprises a tongue groove 9 with a lower part formed in the core material 5 and an upper part, the upper lip 9a, formed in a different material than the core 5. The upper lip 9a comprises preferably a more flexible material than the core 5 that may be more rigid. Such a locking system may be used to decrease the thickness of the floor panel 1 and the core 5.

Figure 1C:
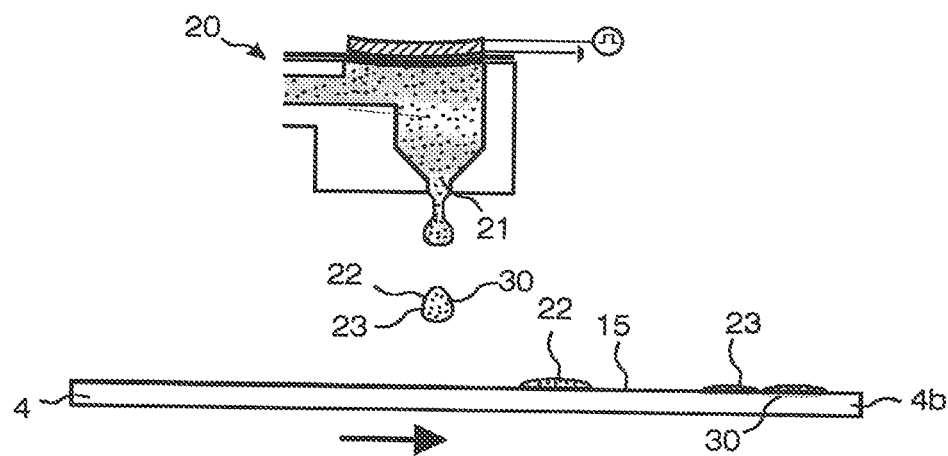

FIG. 1c shows a Piezo print head 20 that applies a liquid pigment based ink 21 as small drops 22 on a substrate 4 that in this embodiment is a paper substrate 4b. The liquid substance of the ink evaporates and penetrates into the surface 15 of the paper substrate 4b such that the pigments 23 are bonded to the surface 15 by the binder 30 of the ink 21 that in a water based ink may be a liquid acrylic binder.

Figure 1D:
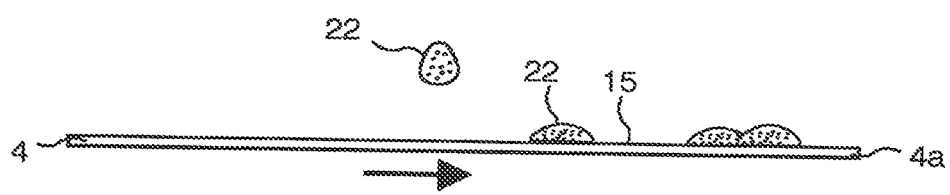

FIG. 1d shows a similar application on a dense surface such as a PVC foil or a melamine formaldehyde impregnated paper 4a. The liquid substance of the water based ink dispersion cannot penetrate into the dense PVC or into the melamine formaldehyde impregnated material and the ink drops 22 float in an uncontrolled way and form clusters of ink drops. The result is a low quality print that is not possible to use in flooring applications.

Figure 2A:
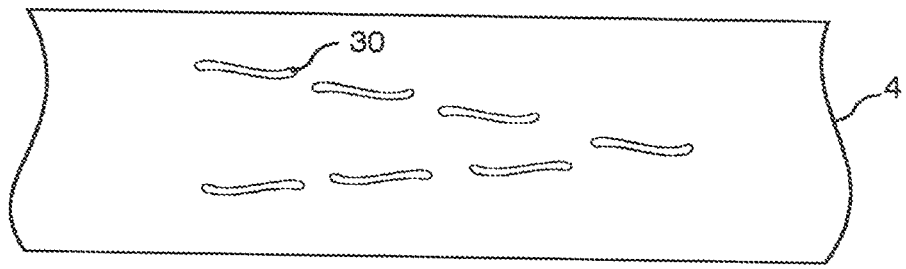
FIGS. 2a-d Illustrate a two-step digital printing method with binders and powder.
Figure 2B:
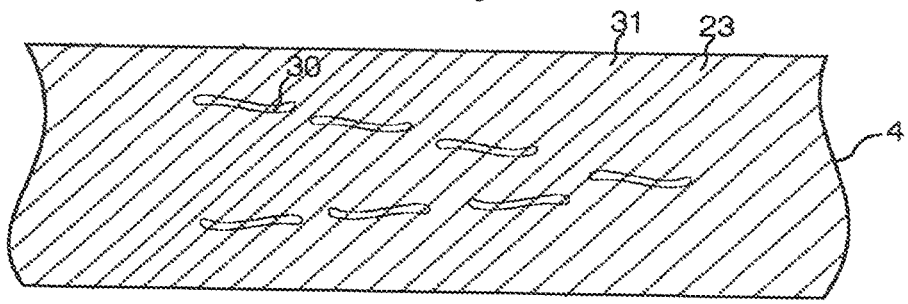
Figure 2C:
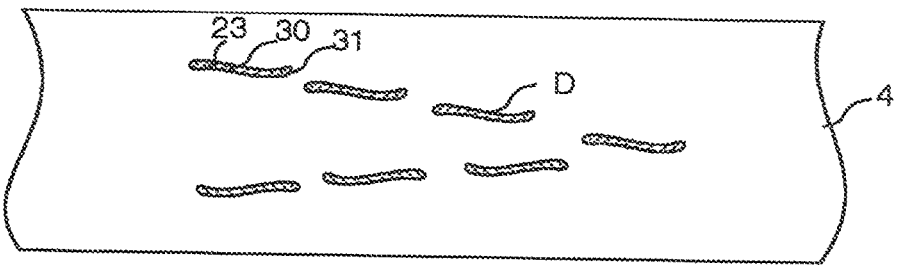

FIGS. 2a-2c show schematically that a digital print may be formed in two steps with a Binder And Powder (BAP) printing method that has recently been introduced in flooring application by Välinge Innovation AB, for example, as described in U.S. patent application Ser. Nos. 13/940,572 and 14/152,253, which hereby are incorporated by reference in its entirety. A binder or a so called blank ink 30 that does not comprise any colorants is applied digitally and is used to bond a powder or a so called dry ink 31 that comprises pigments 23.

FIGS. 2a and 2b show that a binder pattern 30 or image is formed digitally by an ink head that preferably only applies a binder or so called blank ink 30 on a substrate 4. A powder based dry ink 31, that may comprise small coloured particles for example pigments 23, is applied randomly preferably in dry form such that the powder particles are in contact with the binder pattern 30. FIG. 2b shows a preferred embodiment where dry ink 31 is scattered over the binder pattern 30. FIG. 2c shows that the binder 30 connects some particles of the dry ink 31 that form the same pattern as the binder 30 and a digital print D is formed on the substrate 4 when non-bonded dry ink 31 is removed by for example vacuum. Several colours may be applied and a multi colour high quality image may be formed in a cost efficient way since the costs for the blank ink 30 and the dry ink 31 are considerable lower than for conventional ink comprising pigment dispersions. The BAP method may provide a digital print with the same or even superior quality as conventional digital printing technology. An advantage is that the print head does not have to handle pigments that may clog the nozzles of the print head.

Figure 2D:
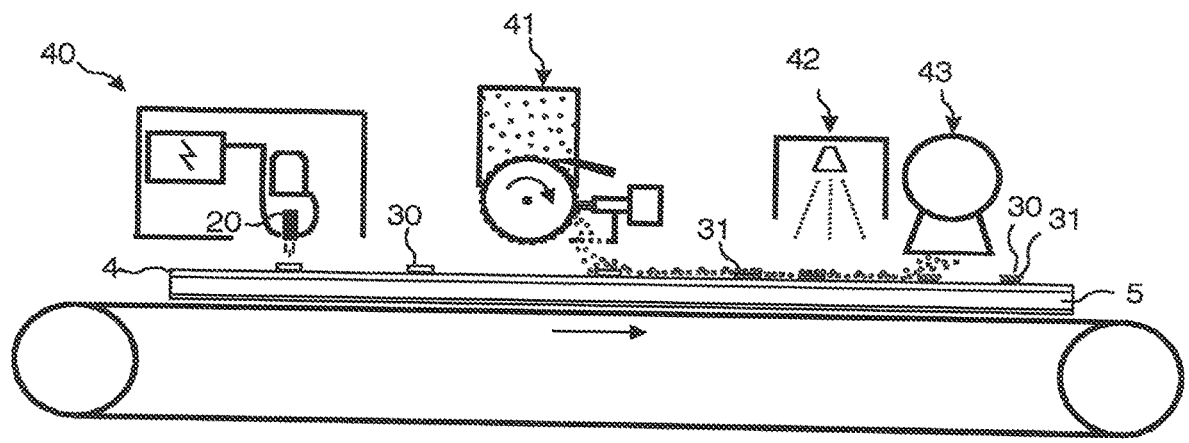

FIG. 2d shows a BAP printing equipment. A digital printer 40 applies a binder 30 on specific and well-defined portions of the substrate as a transparent image and dry ink 31 in powder form is scattered on the binder pattern with a scattering device 41. The binder may be dried or cured by IR or hot air with a curing device 42 and non-bonded dry ink particles are removed by a powder-removing device 43. The substrate 4 is in this embodiment attached to an upper part of a core material 5 that comprise wood fibres or thermoplastic material.

The BAP printing may be combined with conventional ink jet printing. The major part of the colorants in a digital print may be applied with the BAP printing method and only some specific colours may be printed with the ink jet printing method.

The BAP principle may be used to apply a well-defined powder layer with a uniform thickness and with a basic colour on the whole surface of a substrate 4. Generally all types of particles may be applied and a wide variety of binders in liquid and dry form may be applied.

Figure 3A:
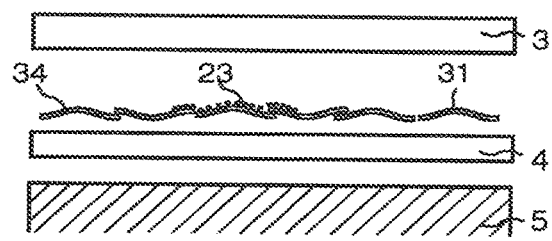
FIGS. 3a-f Illustrate digital printing on a print layer.
Figure 3B:
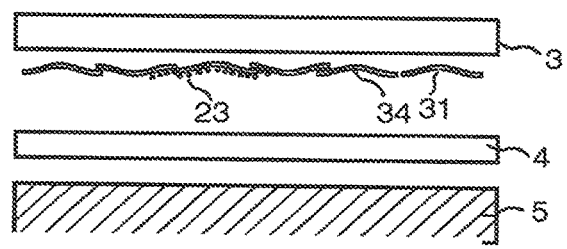

FIGS. 3a and 3b shows the basic principle to form a decorative wear resistant surface 4, 34, 23, 3 having a digital print comprising pigments 23. A digital print with preferably a water based ink and pigments 23 is applied on an upper side of a print layer 34 as shown in FIG. 3a or on the lower side of the print layer 34 as shown in FIG. 3b. The digital print may be made with a conventional ink jet method or with the BAP method. The lower substrate 4, preferably comprising a base colour, and the upper transparent wear resistant layer 3 are laminated to each other under heat and pressure with the print layer 34 and the pigments 23 positioned and laminated between the two layers. The lower substrate 4 is laminated to a core 5.

An advantage is that the digital print is applied on a print layer 34 that may have properties adapted to create a high quality digital image and that may be more suitable for the printing process than the dense and smooth surfaces of the materials used in the substrate 4 and in the transparent layer 3. The print layer 34 may have favourable printing and bonding properties allowing a strong lamination to the different layers used to form the decorative wear resistant surface under heat and pressure.

The print layer may comprise many different particles such as organic or inorganic fibres or mineral particles in the principles described below. The particles may comprise fibres 31 such as cellulose fibres as shown in FIGS. 3a and 3b. The particles may comprise a thermoplastic material such as PVC, preferably a thermoplastic powder such as PVC powder.

Several principles may be used to form the print layer 34.
1) According to a first principle, binders are used to connect the particles to the substrate 4 or the transparent layer 3. The BAP method may be used to connect and to form well defined layers.
2) According to a second principle, the particles are attached to a substrate 4 or to a transparent layer 3 with heat and pressure. A wide range of particles will bond to a thermoplastic material such as for example PVC if the thermoplastic material is heated above the softening temperature and pressed against the particles. A very well defined layer of connected particles may be formed when the thermoplastic material is cooled.
3) According to a third principle, a print is applied and bonded to an upper part of a loose particles layer that is used as a print layer 34. One of the layers, preferably the transparent layer 3, is pressed against the print that is bonded to the layer preferably with heat and transferred together with some particles from the print layer.
4) According to a fourth principle, a separate thin film shaped print layer is used as a base for the print and the print layer with the print is thereafter laminated and connected to the layers.

Figure 3C:
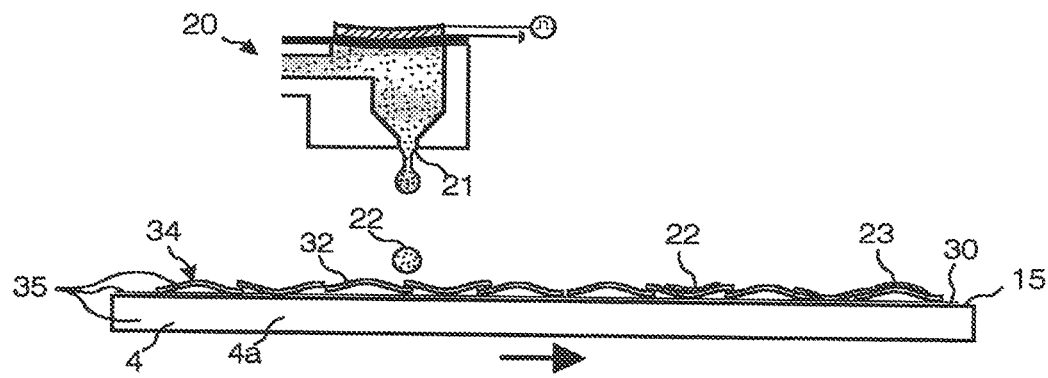

FIG. 3c shows a digital print according to the first principle of the invention that may be used to produce the decorative surface layer of a LVT panel. FIG. 3a shows a substrate 4 that may be a thermoplastic foil such as PVC foil 4a. The substrate 4 may have a thickness of about 0.1-0.6 mm. One surface 15 of the substrate 4 is coated with a binder 30. The binder 30 may for example be a water based thermoplastic vinyl polymer such as PVA, PVAc, or a water based acrylic polymer emulsion that preferably comprises gels in order to increase the viscosity or a dispersion of vinyl acetate and ethylene. The binder 30 may be applied in liquid form in one or several steps and with partial drying between the applications in order to increase the viscosity. It is preferred that the binder has a higher viscosity than the ink applied by the print head. The particles or fibres 32, preferably bleached cellulose fibres, that after a pressing operation are substantially transparent, are scattered on the wet binder 30 and non-bonded fibres are removed according to the BAP principle.

A Piezo print head 20 is used to apply ink drops 22 on the print layer 34. The print layer 34 prevents floating of ink drops 22 after printing and bleeding of the pigments 23 during lamination when for example heat and pressure is used to fuse the foil to a core comprising thermoplastic material, preferably PVC, and a transparent protective layer to the foil 4a during production of a LVT panel. A high quality digital print and a strong bonding of the layers may be obtained even in the case when water based ink 21 preferably comprising an acrylic binder is used.

The print layer is preferably applied on a decorative foil 4a that comprises a base colour. The print layer and the digital print may also be applied on the lower side of a transparent wear layer.

PVC layers in a LVT panel are fused together with heat and pressure. The PVC material is not liquid and cannot penetrate into a fibre layer. Fibres that during pressing under high temperature, for example 130° C.-160° C., are in contact with a PVC layer will be fused to the surface of the decorative foil 4a or of the transparent layer.

Preferably, the fibre based print layer is thin, for example having a thickness of 0.003-0.10 mm, especially when PVC foils and cellulose fibres are used. Preferably, the binder bonds the majority of the fibres. Loose fibres may cause delamination. A thick fibre layer will generally not give sufficient bonding between the decorative PVC foil 4a and the transparent wear layer except when a binder 30 is used that during lamination may penetrate into the fibres. The bonding between thermoplastic layers is preferably obtained by the binder 30 that connects the fibres 32 to one of the layers and the acrylic binder in the ink 21 that is applied on the fibres during printing and that bonds the fibres to the other layer during lamination. Two binders are preferably used to connect PVC layers on each side of the fibres—a first binder 30 applied prior to the application of the fibres and a second binder applied on the fibres by the ink 21 during the digital printing.

It is preferred that a fibre based print layer 34 has a thickness of about 0.03-0.10 mm or a weight of about 10-30 g/m2.

In most applications when a full print is applied over the whole surface sufficient amount of binders will be applied on the fibres 32 by the binder in the ink 21. In some applications additional binders may be needed in order avoid delamination. Such binders may be applied by a separate row of print heads that applies blank ink comprising a binder, preferably an acrylic binder, on the fibres. Binders may also be applied on both layers.

The method may be used to apply a print layer in line on a foil that is thereafter printed digitally in a second production step. The method may also be used to produce special coated foils or papers that constitute a print base 35 and that may be supplied in rolls or as sheets to a factory where the final digital printing takes place.

Figure 3D:
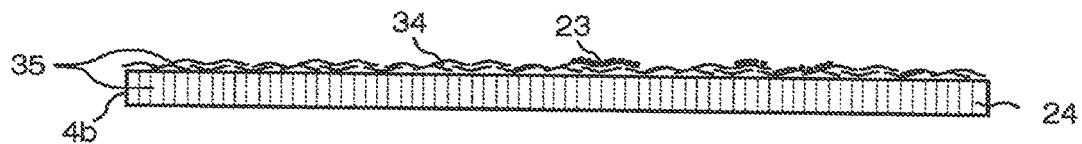

FIG. 3d shows that similar methods may be used to form a print layer 34 on for example a paper 4b that is impregnated with a thermosetting resin 24 for example a melamine formaldehyde resin. The paper 4b may be a decorative paper with a base colour and the print layer 34 is applied on the coloured surface. It may also be an overlay paper and the print layer is applied on a surface that after lamination constitutes the lower side of the overlay. The bonding may be obtained by just coating the dry melamine surface with water. The dry melamine formaldehyde layer melts and bonds the particles 32, preferably the fibres to the melamine formaldehyde impregnated surface. The melamine formaldehyde impregnated paper, which generally comprises a resin content of 50% and more is covered by an open fibre structure, preferably bleached cellulose fibres, that preferably comprise much lower resin content than the paper substrate. The resins in the upper fibres that are intended to be printed are only needed to bond the fibres to the paper during printing and the resin content may be lower than about 10 wt %. The upper fibres may be essentially free from resins and the ink drops comprising pigments 23 may be applied directly on the fibres. This eliminates floating and bleeding during lamination. Melamine may also be applied in liquid form on the dry melamine layer. The application of the binder and the powder may be made as a separate production step after impregnation or in line in connection with the impregnation. The thickness of a fibre based print layer is less essential when melamine impregnated papers 4*b* are used as a substrate since melamine floats during lamination and all fibres are automatically impregnated and bonded by the liquid melamine.

Many different organic and inorganic particles and binders may be used to form a print layer 34. on a substrate and the particles and binders may comprise pigments or other types of colorants. It is however an advantage in some applications if the particles are such that they are transparent or at least semi transparent when heat and pressure is applied during lamination. The base colour of the substrate may be used as one of the colours in the print and the digitally applied image will not be disturbed by the particles that form the print layer. The particles and the binder should be adapted to the materials and methods that are used to connect the decorative layer to a panel core and to protect the print from wear.

Particles that are compatible with several polymer materials and especially thermoplastic material such as PVC but also thermosetting resins are for example cellulose fibres, kaolin, talk, chalk, limestone, carbonate, feldspar, glass fibres, aluminium oxide, silicon carbide, silica and similar minerals.

Separate polymer materials may be used as binders to connect particles to a thermoplastic foil material such as a PVC foil. The bonding can also take place in line with the foil production and preferably PVC in liquid form may be applied on the foil surface and may connect the particles.

Fibres and other particles may also be connected to a PVC material for example a PVC foil without binders. The foil may be heated and pressed against a particle layer and particles that are in contact with the hot foil will be connected. A thin and very well defined layer of particles may be applied by the hot pressing method and a strong bonding may be obtained.

Figure 3E:
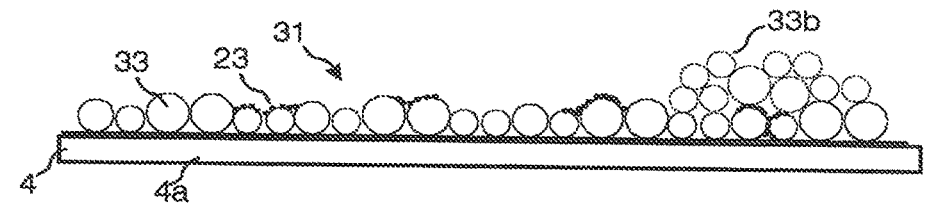

FIG. 3*e* shows a substrate 4 that in this embodiment is a PVC foil 4*a*. Thermoplastic particles 33 preferably PVC powder, for example VESTOLIT, are applied on a binder that may be a water based thermoplastic polymer for example PVA, PVAc or an acrylic polymer emulsion. VESTOLIT powder gives a strong bonding between individual particles and PVC layers when heat end pressure is applied and the print layer thickness may be much larger than when fibres or minerals are used as a print layer. The porous microstructure of the plastic particles forms a print layer that prevents floating of the ink drops and pigments 23 are attached to the particles. PVC powder may have a basic colour but may also be transparent such as VESTOLIT when fused together with heat and pressure. A second powder layer 33*b* comprising thermoplastic particles may be applied over the digital print and may form a protective wear layer that may replace the transparent foil 3. The second layer 33*b* may also comprise a binder and preferably also wear resistant particles such as aluminium oxide particles. The layers may be applied and bonded to the substrate by the BAP method as dry ink 31.

The above-described methods may be combined. The particles may for example comprise a mix of fibres and PVC powder such as VESTOLIT and such a mix may provide an increased bonding between the layers. The bonding properties of a the particles in a print layer may be increased if for example vinyl based polymer powder such as VINNAPAS is mixed with the particles.

Figure 3F:
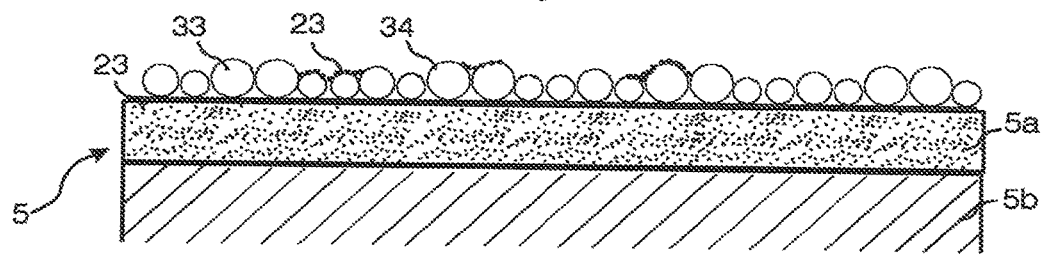

FIG. 3*f* shows that a LVT floor panel may have an upper core layer 5*a* comprising PVC, fillers and pigments 23 and this core layer 5*a* may replace the decorative foil as a colour barrier against the other parts of the core 5*b* that have an undefined colour that may telegraph trough the printed pattern. The print layer 34 comprising plastic particles 33 is applied directly on a core layer 5*a* and ink drops comprising pigments 23 are applied on the plastic particles 33.

Figure 4A:
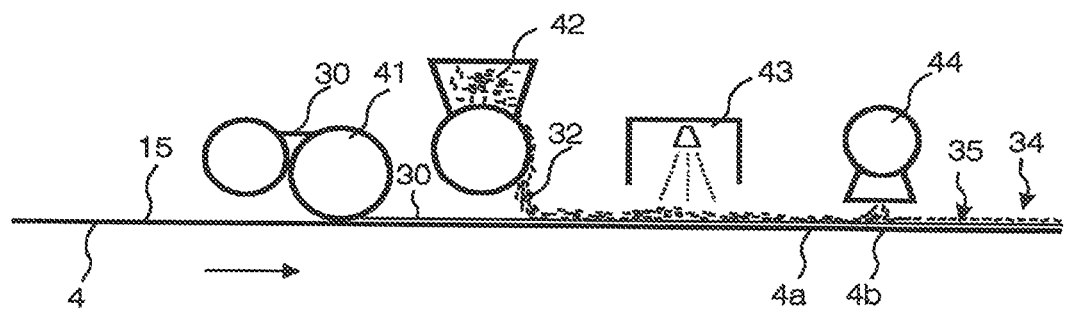
FIGS. 4a-c Illustrate a method to form a print layer, to apply a digital print and to form a decorative surface layer.

FIG. 4*a* shows schematically equipment that may be used to form the print layer 34 or a print base 35 in preferably four production steps. The equipment comprises a binder application device 41, a scattering device 42, a curing device 43 and a powder removing device 44. The binder 30 may be applied with the binder application device 41 that is for example a roll coating in one or several steps on the upper surface 15 of the substrate 4. Primers may also be used. The rolls may have a structured surface such that a raster shaped binder pattern is formed. The binder may also be applied by spraying or digitally with a Piezo print head. Roll coating is preferred in several applications since the binder may have a much higher viscosity than when spray nozzles or digital Piezo print heads are used. In a second step the powder, in this preferred embodiment fibres 32, are scattered on the wet binder 30 with the scattering device 42. The binder is in a third step cured with the curing device 43 that may comprise IR light, hot air, UV light etc. depending on the binder. Finally in a fourth step the non-bonded fibres 32 are removed with the powder removing device 44 where vacuum and airstreams may be used and a substrate 4 with a print layer 34 is formed.

Several other methods may be used. Drying or curing of the binder may take place when non-bonded particles have been removed. The powder may be applied in a precise manner and removal of non-bonded powder may be excluded. Scattering may be replaced with application methods where the substrate with the binder is pressed against powder or where the substrate passes a container filled with powder.

The substrate 4 with the print layer 34 may be used as a semi finished print base 35 product and may be transported in rolls or sheets to another location where the digital print is made. The print layer 34 and the print base 35 may also be formed in line with the digital printing operation.

Figure 4B:
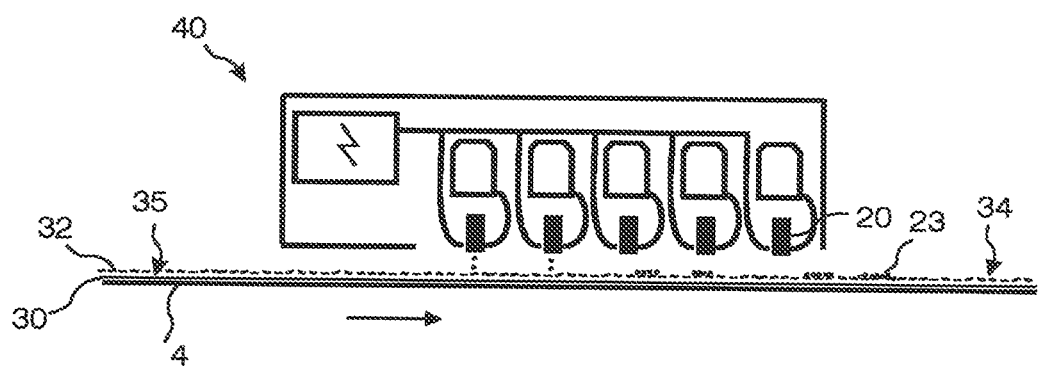

FIG. 4*b* shows digital printing on the print layer 34 or on a print base 35 with a digital printer 40 comprising five print heads 20, each comprising one colour. The print layer 34 comprises in this embodiment fibres 32 that are bonded to the substrate 4 with a binder 30. The digital print may be made with conventional printing methods where pigments 23 are included in the liquid ink applied by the print heads 20. The digital print may also be made partly or completely with the BAP printing method as described above where liquid blank ink comprising a binder and dry ink comprising pigments are applied in two separate steps.

Figure 4C:
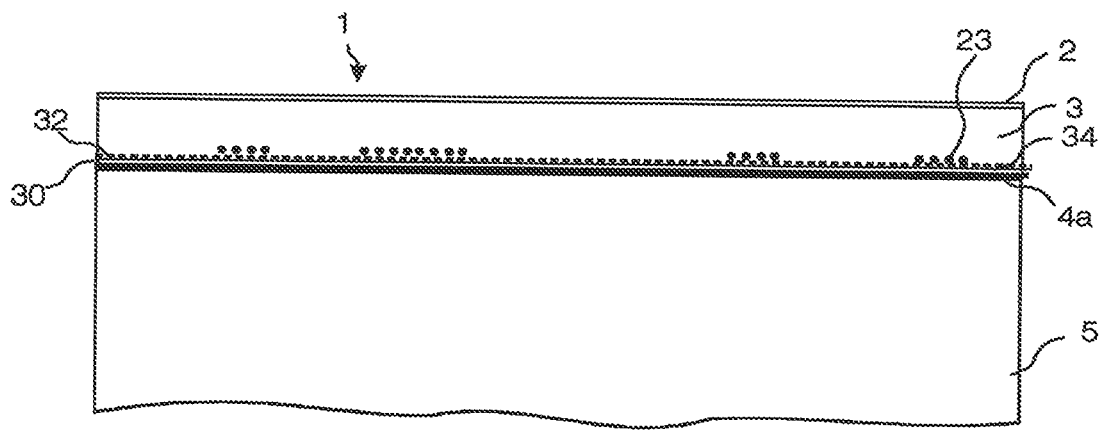

FIG. 4*c* shows an upper part of an LVT panel 1. A thermoplastic foil 4*a* such as a PVC foil with a print layer 34 and a digital print comprising pigments 23 is positioned between the core 5 and the transparent wear layer 3. Alternatively, the print layer 34 and the digital print with the pigments 23 are positioned on the lower side of the transparent layer 3 (not shown). The very thin print layer 34 will be surrounded by the binders 30 from the print layer and the ink that during pressing may penetrate into the print layer such that a strong lamination of the layers may take place. The pigments 23 are firmly connected to the print layer and bleeding may be avoided. The wear layer 3 comprises a polyurethane layer 2 on the upper side.

According to one aspect of the invention a LVT floor panel is provided having a core 5 comprising a thermoplastic material and fillers, an upper transparent surface layer 3 and a decorative layer 4 between the core 5 and the transparent layer 3. The decorative layer 4 comprises a digital printed décor preferably provided by water-based ink comprising pigments and acrylic binder.

According to another aspect of the invention a LVT floor panel is provided having a core 5 comprising a thermoplastic material and fillers, an upper transparent surface layer 3 and a decorative layer 4 between the core 5 and the transparent layer 3. The decorative layer 4 comprises fibres 32, preferably cellulose fibres or minerals.

Figure 5A:
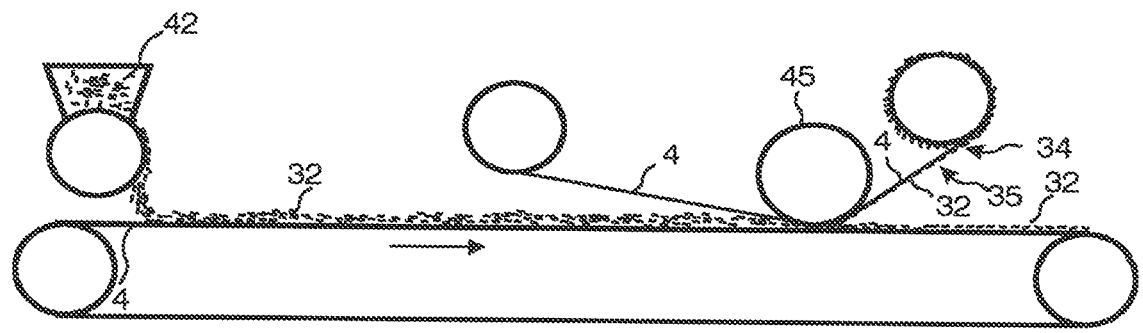
FIGS. 5a-c Illustrate digital printing and print layers.

FIG. 5a shows a method to form the print layer 34 and the print base 35 according to the second principle of the invention. Particles are scattered on a on a conveyor or a carrier by a scattering device 42. A substrate 4 that may be a thermoplastic foil preferably a PVC foil is heated by preferably a hot press roller 45 and pressed against particles, for example fibres 32, preferably cellulose fibres, such that a thermal bond is accomplished between the particles 32 and the substrate 4.

Hot bonding may also be used to form a print layer in applications where particles are scattered on a hot core layer preferably comprising pigments. A hot wood plastic composite panel comprising PVC or PP mixed with wood fibre based fillers may also be scattered with particles preferably fibres after the extrusion when the panel is still hot.

Figure 5B:
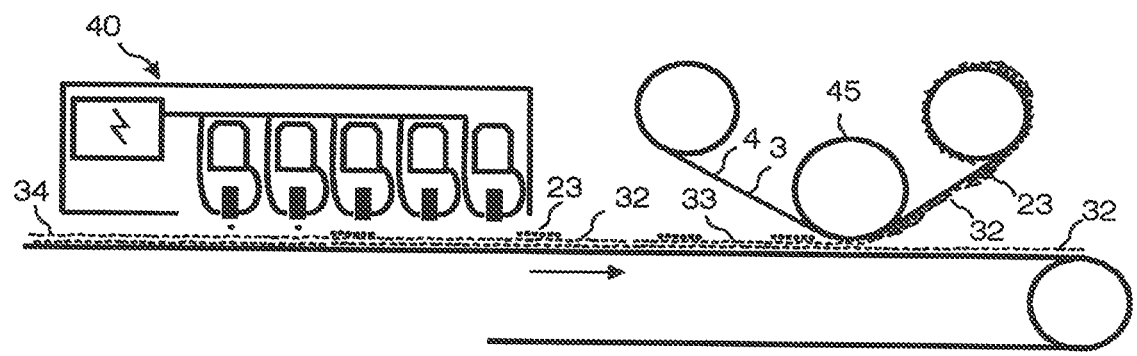

FIG. 5b shows a method to form the print layer according to the third principle of the invention. Particles, preferably fibres 32, thermoplastic powder 33 such as PVC powder or minerals are for example scattered as a continuous powder layer on a conveyor and they are not connected to a substrate. The continuous powder layer is used as a print layer 34 for the digital print that is applied by a digital printer 40 on the loose particles of the continuous powder layer 34. The digital print may be printed by an ink comprising a pigment dispersion. A thermoplastic foil that may be a substrate 4 comprising a base colour or a transparent foil 3 is heated and pressed against the pigments 23 that are transferred to the thermoplastic foil together with particles from the print layer 34, for example fibres 32 or thermoplastic powder 33. It is an advantage if the pigment dispersion in the ink comprises acrylic resins that provide a strong bond between the pigments and the thermoplastic foil. Such method to transfer a digital print from powder-based particles may also be used without hot bonding. A melamine formaldehyde paper may comprise a wet melamine binder and may be pressed against the print with the powder. A thermoplastic foil comprising a binder may also be pressed against the print.

Figure 5C:
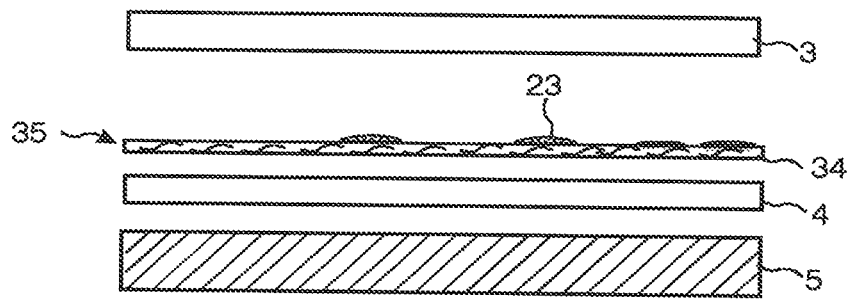

FIG. 5c shows a method to form the print layer 34 and the print base 35 according to a fourth principle of the invention. The print layer 34 is a paper layer preferably a non-impregnated raw overlay paper comprising fibres that are transparent or semi transparent after lamination. A digital print is applied preferably on a side of the print layer 34 that is laminated to the upper transparent layer 3 and a lower substrate 4. The transparent layer 3, the print layer 34 and the substrate 4 are laminated to a core 5. It is an advantage if the paper is thin and has a weight of about 40-60 gr/m2. The bonding strength may be increased if for example blank ink comprising an acrylic binder is applied digitally or with roll coating on one or both sides, preferably after the printing step. The paper may be replaced by a non-woven material made from long fibres, bonded together by chemical, mechanical, heat or solvent treatment.

The hot bonding and lamination of the layers according to the second, third and fourth principles is preferably made at temperatures of about 120° C.-160° C. The four described principles may be combined. A first layer of particles may be applied for example with hot bonding and a second particle layer may be applied by the use of a binder.

The particles may in all embodiment of the invention comprise colour pigments that may be used to provide a print layer with a base colour.

Figure 6A:
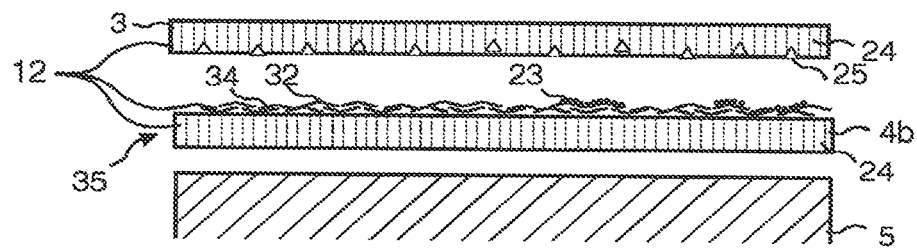
FIGS. 6a-e Illustrate digital printing on impregnated paper.

FIG. 6a shows a preferred embodiment, similar to the embodiment shown in FIG. 3d, comprising a core 5, and a decorative wear resistant surface layer 12 comprising a paper substrate 4b impregnated with a thermosetting resin 24, preferably a melamine formaldehyde resin 24, a print layer 34, preferably comprising cellulose fibres and pigments 23 applied by a digital print head on the print layer 34. The print is covered by a wear layer 3 which in this embodiment is a conventional transparent overlay impregnated with a melamine formaldehyde resin 24. The overlay 3 comprises wear resistant particles 25. The three layers are heated, pressed and laminated to the core 5. This preferred embodiment may be used to form a print base 35. Cellulose fibres 32 are applied as a print layer 34 and bonded to a paper substrate 4b impregnated with a thermosetting resin 24, preferably a melamine formaldehyde resin. The cellulose fibres 32 may be bonded to the impregnated paper 4b with a thermosetting binder, preferably a melamine formaldehyde resin, that may be applied as dry powder or as a liquid. The paper 4b and the applied cellulose fibres 32 may comprise a base colour. The fibre type and/or the fibre size and/or the fibre orientation are preferably different in the print layer and the paper substrate 4b. The fibres have preferably a length of about 50-300 microns and a thickness of about 10-50 microns. The paper fibres may be adapted to cover a core 5 and provide a strong lamination to the core and the cellulose fibres in the print layer 34 may be adapted to receive and bond ink drops. Preferably, the fibres in the print layer 34 are shorter and comprise a lower amount of resins than the fibres in the paper substrate 4b that may be longer and that may be coated with a higher resin content. The resin content in the paper substrate is preferably at least about 40 wt %.

Figure 6B:
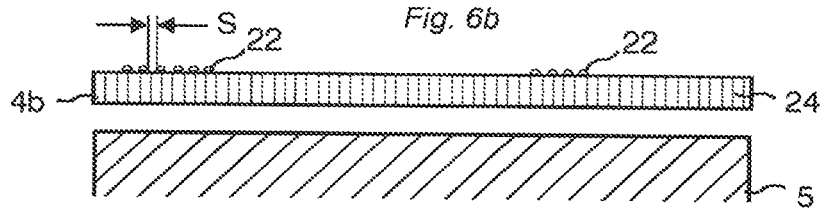
Figure 6C:
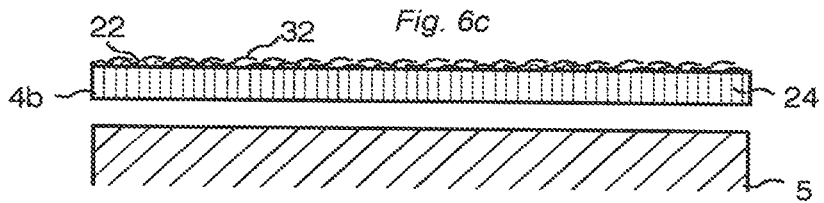
Figure 6D:
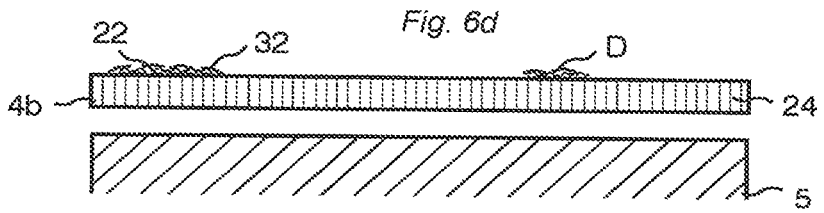

FIGS. 6b-6d show that the BAP method may be used to apply a digital print directly on a dense substrate without a print layer. A preferred embodiment comprise a core 5, a paper substrate 4b impregnated with a thermosetting resin 24, preferably a melamine formaldehyde resin and a digital print applied on the substrate 4b by the BAP method. The printing method, the blank ink or the binder and the dry ink or the colorants have been specially adapted to provide a high quality print on a dense surface, preferably a paper comprising a base colour and impregnated with a melamine formaldehyde resin or a thermoplastic foil.

A first problem that has to be solved is the floating of the ink drops 22 when they hit for example a dense melamine formaldehyde impregnated surface, especially a surface that comprises a high content of melamine formaldehyde resin exceeding 40 wt % of the impregnated paper. This may be solved with blank ink having a high viscosity and with a printing method that positions the ink drops preferably side by side and spaced from each other in a raster pattern such that the ink drops are not in contact with each other. Clusters of ink drops attracted to each other by the surface tension will be avoided.

A suitable blank ink that preferably may be used in a high viscosity print head designed to operate with a viscosity of about 10-12 cps and higher such as a Fuji print head may be water based glycol/glycerine solution combined with a binder. A suitable blank ink for a high viscosity print head may for example comprise about 20% water, 60% glycerine, 10% diethylene glycol and 10% binder, preferably a binder comprising a thermally cross linkable acrylate copolymer dispersion.

A second problem that has to be solved is bleeding of the pigments during pressing when the melamine resin is in a liquid stage. This problem may be solved with pigments that are connected to a pigment carrier such as wood fibres 32 that are not floating since they are pressed against the paper substrate 4b during pressing and curing.

A suitable dry ink comprises preferably cellulose fibres 32 coated with pigments bonded to the fibre surface with a thermosetting resin, preferably a melamine resin or an acrylic binder.

Such pigment bonding may be obtained with production methods where the pigments and fibres in a first step are mixed to a powder. In a second step water comprising for example melted melamine resins or a water based acrylic binder is mixed into the dry powder and the wet mix is thereafter heated and dried. In a third step the dried powder is milled and sieved such that a suitable particle size is obtained.

The coated and sieved fibres have preferably a length of about 50-150 microns and a thickness of about 10-50 microns. Such fibres are easy to apply with scattering and to remove with airstreams and they provide a high resolution print. The fibres will also absorb a substantial part of the liquid ink and floating of ink drops will be eliminated after the application of the dry ink.

The pigment coated and sieved fibres are preferably in a fourth production step mixed with dry melamine particles in powder form that melt and bond the coated fibres to the surface of the impregnated paper when they are in contact with the liquid blank ink drops.

FIG. 6b shows blank ink drops 22 applied on a paper substrate 4b impregnated with a thermosetting resin 24, preferably a melamine formaldehyde resin. The ink drops 22 are applied in a raster pattern and spaced from each other with a space S that may be about 10 microns or larger.

FIG. 6c shows dry ink particles comprising pigment-coated fibres 32 applied on the blank ink drops 22 and the paper substrate 4b.

FIG. 6d shows the paper substrate 4b when non-bonded dry ink particles has been removed by for example air streams such that only coated fibres 31 bonded by the blank ink drops 22 are attached to the substrate 4b. Individual fibres 32 may be connected to several ink drops 22. The fibres will overbridge the space S and the space S between the ink drops 22 will not disturb the digital image D.

Figure 6E:
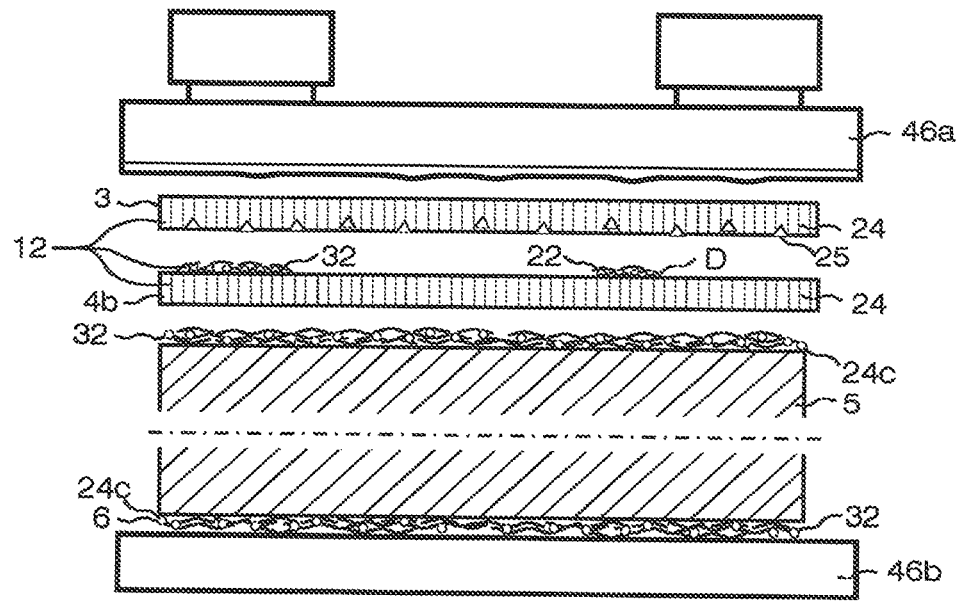

FIG. 6e shows pressing and curing of the decorative wear resistant surface layer 12. The core 5 comprises a balancing layer 6 that may be a powder mix of wood fibres 32 and melamine powder 24c. In some applications a similar powder layer 32 may be applied under the paper substrate 4b in order to increase the impact resistance and to allow forming of a deep embossing. The digital print D may be covered by a wear layer 3 which in this embodiment may be a conventional transparent overlay impregnated with a melamine formaldehyde resin 24. The overlay 3 comprises wear resistant particles 25. The wear layer 3 may also be a powder overlay comprising wear resistant particles 25 and binders 24. The layers and the digital print D are heated pressed by an upper 46a and a lower 46b press table and laminated to the core 5.

The above-described BAP printing may also be used to form a digital print on a foil. The substrate may comprise a thermoplastic foil and the dry ink 31 may comprise thermoplastic particles and pigments. Pigments may be bonded to plastic particles with an acrylic binder. Pigments may also be incorporated into the thermoplastic particle body. The plastic particles have preferably a diameter of about 50-150 microns.

The BAP printing may be applied on the substrate in a separate operation or may be applied in line when the substrate is positioned on a core material.

The BAP method may also be used to apply a print layer on a surface. A blank ink raster pattern may be applied on substantially the whole surface of a foil or a paper and particles may be bonded such that a print layer with a well-defined layer thickness may be formed when non-bonded particles are removed.

EMBODIMENTS

1. A method of forming a decorative wear resistant layer, the method comprising:
    providing a substrate (4; 4a; 5) comprising a thermoplastic material and a transparent layer (3) comprising a thermoplastic material,
    providing a continuous print layer (34) comprising particles on the substrate (4; 4a; 5) or on the transparent layer (3),
    printing a digital image comprising colour pigments (23) on the print layer (34), and
    bonding the print layer (34) with the colour pigments (23) to the transparent layer (3) and to the substrate (4; 4a; 5) with heat and pressure such that the digital image is located between the transparent layer (3) and the substrate (4; 4a; 5).
2. The method as in embodiment 1, wherein the transparent layer (3) is a thermoplastic foil, preferably a PVC foil.
3. The method as in embodiment 1 or 2, wherein the substrate is a thermoplastic foil (4a), preferably a PVC foil.
4. The method as in embodiment 1 or 2, wherein the substrate is a core (5), preferably comprising a thermoplastic material, preferably PVC, and fillers.
5. The method as in any one of the preceding embodiments, wherein the print layer (34) prior to printing is bonded to the substrate (4; 4a; 5) or the transparent layer (3) with a binder (30).
6. The method as in any one of the preceding embodiments, wherein the print layer (34) prior to printing is bonded to the substrate (4; 4a; 5) or the transparent layer (3), preferably with heat and pressure.
7. The method as in any one of the preceding embodiments, wherein the print layer (34) is a paper layer or loose particles.
8. The method as in any one of the preceding embodiments, wherein the particles comprise fibres (32), preferably cellulose fibres, more preferably at least partially bleached cellulose fibres.

9. The method as in any one of the preceding embodiments, wherein the particles comprise a thermoplastic powder (33), preferably a PVC powder.

10. The method as in any one of the preceding embodiments, wherein the print is made with water based ink (22), preferably comprising an acrylic binder.

11. The method as in any one of the preceding embodiments, wherein the digital print is made with a liquid binder (30) that bonds a powder (31) comprising pigments.

12. The method as in any one of the preceding embodiments, wherein the substrate (4; 4a; 5) is a part of a building panel, preferably a floor panel (1).

13. The method as in any one of the preceding embodiments, wherein the substrate (4; 4a; 5) is a part of a LVT floor panel.

14. A floor panel (1), comprising
   a core (5) comprising a thermoplastic material,
   a decorative layer (4; 4a) arranged on the core (5), wherein the decorative layer (4; 4a) comprises a thermoplastic material, and
   a transparent layer (3) arranged on the decorative layer (4; 4a), wherein the transparent layer (3) comprises a thermoplastic material,
   wherein the decorative layer (4; 4a) comprises a digital print provided by ink comprising pigments and an acrylic binder.

15. The floor panel (1) according to embodiment 14, wherein the decorative layer (4; 4a) further comprises particles to which the pigments are attached.

16. The floor panel (1) according to embodiment 15, wherein the particles comprise fibres such as cellulose fibres or a thermoplastic powder such as PVC.

17. A floor panel (1), comprising
   a core (5) comprising a thermoplastic material,
   a decorative layer (4; 4a) arranged on the core (5), wherein the decorative layer (4) comprises a thermoplastic material, and
   a transparent layer (3) arranged on the decorative layer (4; 4a), wherein the transparent layer (3) comprises a thermoplastic material,
   wherein the decorative layer (4; 4a) comprises a print layer (34) arranged under the transparent layer (3), the print layer (34) comprising particles and colour pigments attached to said particles.

18. The floor panel (1) according to embodiment 17, wherein the particles comprise fibres such as cellulose fibres or a thermoplastic powder such as PVC.

19. A flexible sheet shaped print base (35), comprising a substrate (4) and a print layer (34), the substrate (4; 4a) having two opposite surfaces, wherein one of said surfaces (15) comprises a thermoplastic material and is essentially covered with the print layer (34), wherein the print layer (34) comprises particles (31) comprising fibres or a polymer material, said particles (31) being bonded to said one of said surfaces (15).

20. The flexible sheet shaped print base as in embodiment 19, wherein the substrate is a thermoplastic foil (4a), preferably a PVC foil.

21. The flexible sheet shaped print base as in embodiment 19 or 20, wherein the fibres (32) are cellulose fibres.

22. The flexible sheet shaped print base as in embodiment 19 or 20, wherein the polymer material comprises a thermoplastic material such as PVC.

23. The flexible sheet shaped print base as in any one of embodiments 18-21, wherein said one of said surfaces (15) is completely covered with said print layer (34).

24. A flexible sheet shaped print base (35), comprising a substrate (4) and a print layer (34), the substrate (4; 4b) having two opposite surfaces, wherein one of said surfaces (15) comprises a paper impregnated with a thermosetting resin and is essentially covered with the print layer (34), wherein the print layer comprises cellulose fibres (31), said cellulose fibres (31) being bonded to said one of said surfaces (15).

25. The flexible sheet shaped print base as in embodiment 24, wherein the resin is a melamine formaldehyde resin.

26. The flexible sheet shaped print base as in embodiment 24 or 25, wherein the fibres (32) are cellulose fibres.

27. The flexible sheet shaped print base as in any one of embodiments 24-26, wherein said one of said surfaces (15) is completely covered with the print layer (34).

28. The flexible sheet shaped print base as in any one of embodiments 24-27, wherein said one of said surfaces (15) comprises a base colour.

29. A method of forming a decorative wear resistant surface layer (12), the method comprising:
   providing a substrate (4; 4b) comprising cellulose fibres, wherein the substrate (4; 4b) is impregnated with a thermosetting resin and comprises a base colour,
   printing a digital image (D) on the substrate (4; 4b) with a digital print head (20) that applies ink drops (22) of a water based ink (30) having a viscosity exceeding about 10 cps on the substrate (4; 4b), and wherein the ink drops (22) are positioned in a raster pattern with a space (S) between each other,
   applying cellulose fibres (32) coated with pigments on the water based ink drops (22) and the substrate (4; 4b),
   bonding a part of the pigment coated cellulose fibres (32) to the water based ink drops (22),
   removing non bonded pigment coated fibres (32) from the substrate (4; 4b),
   applying a transparent layer (3) comprising cellulose fibres on the digital image (D) such that the digital image (D) is located between the transparent layer (3) and the substrate (4; 4b), and
   bonding the substrate (4; 4b), the bonded part of the pigment coated fibres (32) and the transparent layer (3) with heat and pressure.

30. The method as in embodiment 29, wherein the ink comprises water based glycol or glycerine solution combined with a binder.

31. The method as in embodiment 29 or 30, wherein the thermosetting resin of the substrate (4; 4b) is melamine formaldehyde.

32. The method as in any one of embodiments 29-31, wherein the substrate (4; 4b) is a paper layer impregnated with at least 40 wt % of the thermosetting binder, preferably melamine formaldehyde resins.

33. The method as in any one of the embodiments 29-32, wherein the pigment coated cellulose fibres have a fibre thickness of about 10-50 microns and a length of about 50-150 microns.

34. The method as in any one of the embodiments 29-33, wherein the pigment coated cellulose fibres (32) comprise a thermosetting resin or an acrylic binder.

35. A method of forming a decorative wear resistant surface layer (12), the method comprising:
   providing a thermoplastic substrate (4; 4a) comprising a base colour,
   printing a digital image (D) on the substrate (4; 4a) with a digital print head (20) that applies ink drops (22) of a water based ink (30) having a viscosity exceeding about 10 cps on the substrate (4; 4a), and wherein the ink drops (22) are positioned in a raster pattern with a space (S) between each other, applying thermoplastic particles comprising pigments on the water based ink drops (22) and the substrate (4; 4a), bonding a part of thermoplastic particles to the water based ink drops (22), removing non bonded thermoplastic particles from the substrate (4; 4a), applying a transparent layer (3) comprising a thermoplastic material on the digital image (D) such that the digital image (D) is located between the transparent layer (3) and the substrate (4; 4a), and bonding the substrate (4; 4a), the bonded part of the thermoplastic particles and the transparent layer (3) with heat and pressure.

36. The method as in embodiments 35, wherein the water based ink comprises a water based glycol or glycerine solution combined with an acrylic binder.

37. The method as in embodiments 35 or 36, wherein the pigments are bonded to the thermoplastic particles with an acrylic binder.

The invention claimed is:

1. A floor panel comprising
   a core comprising a thermoplastic material,
   a decorative layer arranged on the core, wherein the decorative layer comprises a thermoplastic material, and
   a transparent layer arranged on the decorative layer, wherein the transparent layer comprises a thermoplastic material,
   wherein the decorative layer comprises a print layer arranged under the transparent layer, the print layer comprising particles and colour pigments attached to said particles to form a digital print, the particles comprising at least one of mineral particles, fibers, or thermoplastic powder.

2. The floor panel according to claim 1, wherein the particles comprise organic fibers or inorganic fibers.

3. The floor panel according to claim 1, wherein the particles comprise cellulose fibres or at least partially bleached cellulose fibres.

4. The floor panel according to claim 1, wherein the particles comprise a PVC powder.

5. The floor panel according to claim 1, wherein the print layer is continuous.

6. The floor panel according to claim 1, wherein the decorative layer is a thermoplastic foil and wherein the transparent layer is a thermoplastic foil.

7. The floor panel according to claim 1, wherein the floor panel comprises a balancing layer applied on a rear side of the core.

8. The floor panel according to claim 1, wherein the core comprises fillers.

9. The floor panel according to claim 1, wherein the core comprises one or several layers of thermoplastic material.

10. The floor panel according to claim 9, wherein said one or several layers comprises PVC mixed with 20-80% chalk or limestone fillers.

11. The floor panel according to claim 1, wherein the print layer is bonded to the decorative layer or to the transparent layer with a binder.

12. The floor panel according to claim 1, wherein the print layer has a thickness of 0.03-0.10 mm or a weight of about 10-30 g/m².

13. The floor panel according to claim 1, wherein a surface of the decorative layer is completely covered with the print layer.

14. The floor panel according to claim 1, wherein the colour pigments are provided by a water-based ink.

15. The floor panel according to claim 1, wherein the floor panel is an LVT floor panel.

16. The floor panel according to claim 1, wherein the floor panel comprises a mechanical locking system.

* * * * *